US006468637B1

(12) United States Patent
Kwasny et al.

(10) Patent No.: US 6,468,637 B1
(45) Date of Patent: Oct. 22, 2002

(54) PHOTOGRAPHIC-QUALITY PRINTS AND METHODS FOR MAKING THE SAME

(75) Inventors: David M. Kwasny, Corvallis, OR (US); George C. Ross, Philomath, OR (US); Lawrence R. Plotkin, Corvallis, OR (US); John R. Conkrite, Corvallis, OR (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/556,032

(22) Filed: Apr. 20, 2000

(51) Int. Cl.[7] .............................. B32B 3/00; B32B 7/14

(52) U.S. Cl. ....................... 428/201; 428/206; 428/323; 428/327; 428/480; 428/500

(58) Field of Search ................................ 428/201, 206, 428/323, 327, 480, 500

(56) References Cited

U.S. PATENT DOCUMENTS 4,272,594 A * 6/1981 George et al. ................ 430/14
5,327,201 A 7/1994 Coleman et al. ............ 355/278
5,337,132 A 8/1994 Cherian ....................... 355/278
5,714,287 A * 2/1998 Malhotra ...................... 430/47
5,795,695 A 8/1998 Malhotra et al. ........... 430/120
5,795,696 A 8/1998 Malhotra ..................... 430/124
6,268,101 B1 * 7/2001 Yacobucci et al. .......... 430/124

OTHER PUBLICATIONS

Schein, Electro–photography and Development Physics, 2nd Ed., 1992, Springer–Verlag.

* cited by examiner

*Primary Examiner*—Bruce H. Hess
*Assistant Examiner*—B. Shewareged

(57) ABSTRACT

A method for creating photographic-quality prints and prints produced by these methods are disclosed. The prints generally comprise three layers: a transparent carrier; an image, and a particle-based undercoat. The transparent carrier comprises a substrate for receiving an image. The image can be produced by inkjet, electrostatic, or other imaging methods, including reverse printing methods. The particle-based undercoat layer is applied to the image containing side of the transparent carrier. Also disclosed is an apparatus for producing said prints by methods of the present invention.

5 Claims, 1 Drawing Sheet

PHOTOGRAPHIC-QUALITY PRINTS AND METHODS FOR MAKING THE SAME

FIELD

The present invention relates to photographic-quality prints, including non-photographic methods for making such prints.

BACKGROUND

Photography provides an easy and reliable way to permanently capture images for a variety of uses. While photographs provide durable images, they are prone to scratches; have poor resistance to light and ultraviolet radiation (which causes photographic images to fade over time), and degrade when exposed to water. Traditional photography uses harsh and expensive chemicals, requires silver recovery, and involves a process requiring several intermediate steps of handling negatives. While photographic processes can be automated, such automatic processing machines are expensive and bulky and do not eliminate the inherent problems of chemical exposure and handling negatives. Additionally, producing large prints (larger than the traditional 3-by-5 inch or 4-by-6 inch prints) can be quite expensive.

Digital photography and imaging provide cost-effective alternatives for capturing images, but known methods of producing durable, hardcopy prints of digital images are at least as expensive as traditional photographic methods. Images may be printed on paper using inkjet or electrostatic methods. With increasing use of various printing and imaging technologies in the publishing industry as well as in the home, protecting imaged or printed documents against abrasion, water or alcohol spills, ink smear, or other image-degradation processes and effects has become an important consideration. Such protection is particularly desirable for printed or imaged documents produced with water-based or water-soluble inks, or other liquid inks. These inks are commonly used in ink-jet printing, offset printing, and the like.

Hot and cold laminates are the most common methods used to protect images. However, laminates tend to be expensive, typically costing 6 to 80 cents per square foot for materials. The labor-intensive nature of producing durable prints via lamination also increases the cost of such prints.

Laminates may be applied on one or both surfaces of the print. One-sided lamination may lead to excessive curling of the final print, whereas two-sided application can be very expensive in terms of material and labor costs and may excessively increase the thickness of the final print.

Adhesives used for cold laminates may be tacky at room temperature, leaving a sticky residue at the edges of the prints. Additionally, binders used in creating cold laminates are typically water-based, which means the print may delaminate if exposed to excessive water.

Lamination is also susceptible to trapped air pockets, which are viewed as image defects. Most importantly, care must be taken to ensure that the layers of such laminates are accurately aligned to the base media, and such alignment is especially critical for a continuous web laminate. These are just some of the deficiencies of traditional laminates.

Liquid overcoats are commonly used to protect photographic prints and are becoming more popular as protective coatings for inkjet images. Typical systems for applying these overcoats rely on roller coating or gravure type systems to dispense, gauge, and apply the coating. Smaller systems typically apply the overcoat off-line, rather than being an integral part of a single printing and coating unit. Larger systems used by the printing industry are in-line, but require extensive monitoring. Both systems require significant manual cleaning or intervention to maintain the components that contact the liquid.

These liquid overcoats tend to be slightly less expensive than laminates (6–18 cents per square foot). However, because currently available systems must be cleaned frequently and regularly monitored, these methods of using liquid overcoats are just as labor-intensive as the lamination methods, if not more labor-intensive. Additionally, many of the overcoat formulations have residual odors before and/or after application, and some people find these odors offensive or even harmful.

Ultraviolet (UV) light curable liquid overcoats are also available, such as the overcoats commonly used to protect magazine covers. In such a UV-curable system, the liquid is first applied to the surface of the print and then cured to yield a solid, durable, protective coating. Because these liquids are widely used in large volumes for the magazine industry, their cost tends to be significantly lower than most other overcoat options. However, the systems used to apply such UV-curable overcoats tend to be more complicated and costly than other liquid overcoat systems, due to the multi-step application and cure process. Additionally, many of the overcoat formulations have strong odors, some of which are harmful or offensive to people.

Durable digital prints may also be created using a three-layer product made from (1) a transparent carrier as a substrate for an image; (2) an image; and (3) a white opaque laminate backing. Rather than viewing the printed surface directly, or viewing it through an applied clear protective coat, these prints are viewed through the backside of the clear substrate. The undercoat applied to the printed surface provides a white opaque background for the image. Cherian's U.S. Pat. No. 5,337,132 discloses such a three-layered print involving the use of a transparent polyester substrate for receiving a toner image and a solid, opaque backing member which is adhered to the imaged surface (much like a laminated sheet). An off-line heat press is used to adhere the backing to the imaged substrate; however, the backing member must be manually positioned and aligned in the press before the adhesion step.

Another example of a three-layer digital print is disclosed in Coleman et al.'s U.S. Pat. No. 5,327,201, which describes a less labor-intensive method of applying the white backing. In this invention, an off-line applicator is used to carefully register a solid backing member to a carrier before gluing the two together. Malhotra et al.'s U.S. Pat. No. 5,795,695 also discloses, in greater detail, the transparent substrates, backings, and performance improvement additives which may be used in such methods of producing such three-layer digital images.

Electrophotography utilizes powdered thermoplastic particles, generally called "toner," to create images on media. Electrophotography typically involves the steps of: (1) forming a charged electrostatic charge pattern on an intermediary surface; (2) oppositely charging toner particles; (3) adhering the toner particles to the charged pattern on the intermediary surface; (4) transferring the toner particles from the intermediary surface to a receiving media (typically paper); and (5) fusing the toner particles to the receiving media with heat and pressure to coalesce them and adhere them to the surface. Detailed descriptions of electrophotography can be found in Schein, *Electro-photography and Development Physics,* $2^{nd}$ Ed., 1992, Springer-Verlag.

Similar electrostatic methods are also commonly used in the commercial painting industry to powder coat products, parts, or assemblies. One powder coating method charges a powdered paint using an air gun outfitted with an electrode before spraying the charged paint onto an electrically grounded object. Alternatively, an electrically grounded object may be immersed in a charged, fluidized bed of paint particles (typically referred to as "fluidized bed powder coating").

SUMMARY

The present invention addresses the needs described above. Inexpensive photographic-quality prints, methods for creating such photographic-quality prints, and an apparatus for producing these prints are described.

These photographic-quality prints generally comprise three layers: a transparent carrier as a substrate for receiving an image; an image; and a particle-based undercoat. The transparent carrier may include materials which increase adhesion to inkjet dyes or pigments, increase resistance to scratches, increase resistance to fading, increase resistance to moisture, increase resistance to UV light, or provide a matte, texture, or gloss. The transparent carrier generally comprises a square or rectangular sheet, though the shape of the carrier is not limited in any way, and the size and thickness of the carrier may vary.

The image can be provided to the carrier using commonly known and available means, such as inkjet printing, electrostatic methods, and other imaging methods. In some embodiments, the image is reverse printed to the transparent carrier, forming a mirror image. A particle-based undercoat generally covers the printed surface and, once fused, protects the printed area, providing a solid-fill, reflective background.

Thus, a photographic-quality print of the present invention can be understood as an image sandwiched between two protective layers—a transparent carrier and a particle-based undercoat. In such an embodiment, the viewer looks at the image through the transparent carrier surface opposite the printed surface.

The particle-based undercoat is applied to the same side of the carrier as the image. Application of the particle-based undercoat, rather than a solid laminate layer, solves problems inherent in the known prior art, such as avoiding a critical need for aligning solid laminate members. Particle-based undercoats of the present invention are generally less expensive than solid laminates and also avoid problems caused by air pockets trapped under solid laminates. Methods of the present invention for applying particle-based undercoats are also less labor-intensive than known methods of protecting digital images, such as using laminates or liquid overcoats.

A particle-based undercoat such as an opaque white powdercoat, toner, pigment, or powdered plastic resin may be used. The particle-based undercoat may be applied to the transparent carrier in a single step, or the undercoat may be first provided to the carrier and then affixed to the carrier. The particle-based undercoat may be applied to form a layer of uniform or non-uniform thickness across the transparent carrier. Different shades of white, or alternate colors of undercoat, or a transparent undercoat, may be used to alter the appearance of the prints.

The particle-based undercoat may also include materials that increase the adhesion to inkjet dyes or pigments, increase adhesion to the carrier medium, increase resistance to scratches, increase resistance to fading, increase resistance to moisture, increase resistance to UV light, provide a smudge resistant finish, provide a scuff resistant finish, or have similar rheological and mechanical properties as the transparent media.

An apparatus embodying methods of the present invention is also described. The apparatus comprises an imager for providing an image to the transparent carrier and a particle-based undercoat module for applying and affixing the particle-based undercoat to the transparent carrier.

DETAILED DESCRIPTION

Figure 1:
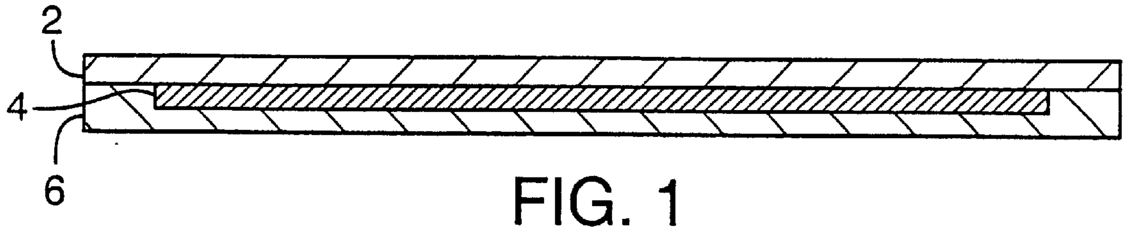
FIG. 1 illustrates one embodiment of an enlarged, cross-sectional view of a photographic-quality print of the present invention.

The present invention relates to methods for creating photographic-quality prints, the prints produced using such methods, and apparatuses for producing such prints.

The prints of the present invention include a transparent carrier as a substrate for receiving an image. Some embodiments of the present invention use a completely transparent carrier. Alternative embodiments use a carrier having a transparent or opaque border or frame to provide additional advantages to the final printed product, such as enhanced aesthetic appeal or additional structural support (such as by a cardboard frame).

The transparent carrier generally comprises a base material with some coatings useful for optimizing printing and toner adhesion. Base materials suitable for use as a transparent carrier include, but are not limited to: cellulose esters, such as cellulose triacetate, cellulose acetate propionate, or cellulose acetate butyrate; and polyesters, such as polyethylene terephthalate (PET), polyamides, polycarbonates, polyimides, polyolefins, polyesters, or polysufonamides.

A number of suitable transparent carriers are commercially available from various manufacturers, such as Premium Inkjet Transparency Film (product no. C3828A) available from the Hewlett-Packard Company of Palo Alto, Calif.

The base material of the transparent carrier may also include or be coated with materials which increase adhesion of inkjet dyes or pigments, optimize image quality, increase resistance to scratches, increase resistance to fading, increase resistance to moisture, increase resistance to UV light, or provide a matte, texture, or gloss. Such materials include, but are not limited to polyesters, polystyrenes, polystyrene-acrylic, polymethyl methacryclate, polyvinyl acetate, polyolefins, poly(vinylethylene-co-acetate), polyethylene-co-acrylics, amorphous polypropylene and copolymers and graft copolymers of polypropylene.

The transparent carrier typically comprises a sheet having first and second surfaces in the shape of a square or rectangle, though the shape of the carrier is not limited in any way and the size and thickness of the carrier may vary. For example, transparent carriers of the same size and thickness as commonly available printer papers (e.g., letter size, legal size, A4, etc.) can be used. Other embodiments may use carriers suitable for use in large-scale imaging applications, such as applications using the Hewlett-Packard Model 2500 Designjet inkjet printer typically used in engineering, architecture, or cartography applications.

One of ordinary skill in the art will understand that an image can be applied to the second surface of the carrier using commonly known and available means, such as inkjet or electrostatic printing. The present invention includes printing an inkjet image on one surface of a transparency film and, generally, the image is viewed through the opposite surface of the film. Therefore, one ordinarily skilled in the art will understand that "reverse printing" includes printing a mirror image of the image that is to be viewed. The image may be reverse printed to the transparent carrier using the means described above. If reverse printing is used, the image may be viewed through the transparent surface of the carrier in a correct orientation. If reverse printing is not used, the image orientation may be reversed prior to printing. However, image orientation does not necessarily need to be reversed, depending on the wishes of the user. Additionally, since the image will be viewed through the transparent carrier (whereas images of typical prints are viewed directly), care may need to be taken to ensure accurate color reproduction.

If inkjet printing is used, excess moisture from the inks may impede adhesion or uniform dispersion of the particle based undercoat on the printed surface. In addition, if excess moisture is trapped between the clear film and the undercoat, the printed image may bloom or blur at its edges. Therefore, to eliminate such excess moisture, the image may be dried using convection, conduction, or radiation prior to application of the particle-based undercoat.

After the image is provided to the transparent carrier, a particle-based undercoat is applied to the second surface of the carrier (i.e., the same side of the carrier to which the image was applied). The particle-based undercoat may be applied to the second surface of the carrier using commonly known electrophotographic or electrostatic means.

"Particle-based undercoat" is understood to mean that the undercoat is comprised of dry solid particles of virtually any shape, such as (but not limited to) flakes, spheres, grains, or powders. The size of particles used in the particle-based undercoat will depend on the method used to apply the particle-based undercoat to the transparent carrier. Typical electrophotographic systems utilize particles of from about 8 to about 16 microns, though larger or smaller particles may be employed.

The application of the toner particles to the surface of the transparent carrier may be accomplished using electrostatic powder-coating. For example, particles may be charged in an air stream directed at the transparent carrier. Additionally, a fluidized bed of charged particles may be used. The transparent carrier, or a surface behind the transparent carrier, may be grounded to facilitate the attraction of the charged particles to the surface of the transparent carrier.

Another method of applying the particle-based undercoat involves forming a charged field using a corona wire and a ground plate. The transparent carrier may be placed in the charged field, thereby inducing a charge on the transparent carrier. In such an embodiment, oppositely charged particles of the particle-based undercoat are introduced into the field and are brought into contact with the charged transparent carrier.

Still another method of applying the particle-based undercoat involves electrophotographic technology, which offers the advantages of greater control over particle dispersion and particle containment. Electrophotography typically uses developer cartridges to charge and meter out toner. Toner can be transferred directly from a developer unit onto an imaged surface, or a toner layer can be formed on an intermediary roller and subsequently transferred to the imaged surface. The transfer can occur merely with direct pressure contact, with the aid of corona charging of the backside of the imaged film, or with the aid of a biased roller contacting the backside of the imaged film. In the present invention, an electrophotographic developer unit is used to deliver the particle-based undercoat, which is applied to the transparent media in much the same way as a conventional toner.

Dual component magnetic brush toning can be used to facilitate application of the particle-based undercoat. In such an embodiment, a developer unit is filled with particle-based undercoat and magnetic carrier particles. The carrier tribocharges the undercoat particles, causing them to temporarily adhere to the magnetic carrier's surfaces. The magnetic core of the developer roller causes the carrier particles to form chains or bristles extending from the roller surface, each bristle carrying charged undercoat particles. These undercoat particles can then be transferred to an oppositely charged intermediary roller or directly to the transparent carrier surface.

Another method of applying the particle-based undercoat involves using single component magnetic brush toning to facilitate particle application. In such an embodiment, a developer unit houses undercoat particles and a tribosurface, which the toner particles rub against. This rubbing action induces a charge in the particles, which then adhere to the developer roller. A charge field is set up between the developer roller and a second surface. Direct contact may occur between the roller and the second surface, or a gap may placed between the two. This second surface may be either an intermediary roller or a biased surface which the transparent carrier is tensioned across.

Materials suitable for use as a particle-based undercoat include, but are not limited to: poly(vinyl chloride), poly (vinylidene chloride), poly(vinyl chloride-co-vinylidene chloride), chlorinated polypropylene, poly(vinyl chloride-co-vinyl acetate), poly(vinyl chloride-co-vinyl acetate-co-maleic anhydride), ethyl cellulose, nitrocellulose, poly (acrylic acid) esters, linseed oil-modified alkyd resins, rosin-modified alkyd resins, phenol-modified alkyd resins, phenolic resins, polyesters, poly(vinyl butyral), polyisocyanate resins, polyurethanes, poly(vinyl acetate), polyamides, chroman resins, gum damar, ketone resins, maleic acid resins, vinyl polymers such as polystyrene and polyvinyltoluene or copolymers of vinyl polymers with methacrylates or acrylates, low-molecular weight polyethylene, phenol-modified pentaerythritol esters, poly(styrene-co-indene-co-acrylonitrile), poly(styrene-co-indene), poly(styrene-co-acrylonitrlile), copolymers with siloxanes, polyalkenes and poly(styrene-co-butadiene). These materials may be used either alone or in combination. Additionally, particle-based undercoats comprised of such materials may include additional pigments, such as titanium dioxide, to provide a white opaque color.

The particle-based undercoat, the transparent media, or both may also include materials that offer additional or improved characteristics including, but not limited to, materials that increase resistance to scratches, increase resistance to fading, increase resistance to UV light, provide a smudge resistant finish, provide a scuff resistant finish, or have similar rheological or mechanical properties as the transparent media.

For example, to increase abrasion resistance, crosslinked or branched polymers can be used. For example, poly (styrene-co-indene-co-divinylbenzene), poly(styrene-co-acrylonitrile-co-divinylbenzene), or poly(styrene-co-buradience-co-divinylbenzene) can be used.

The particle-based undercoat can also include materials to impart unique finishes (such as a gloss, matte, or satin finish), by modifying the surface characteristics of the final film. For example, inorganic particles such as silica, or organic particles such as methylmethacrylate beads, which will not melt during fusing can be used to impart a level of roughness to the undercoat surface. Low amounts of such roughness-inducing particles will affect gloss level without significantly altering the feel of the surface, while greater amounts will affect both the look and feel of the particle-based undercoat after fusing.

Additives can also be used to protect against degradation from excessive exposure to light. For example, UV absorption additives absorb some of the ultraviolet radiation striking the print, thereby keeping free radicals from forming and degrading the film. Such UV absorbers include substituted hydroxybenzophenones, hydroxybenzotriazoles, and hydroxyphenyltriazines. Hindered amine light stabilizers can also be added to scavenge radicals that manage to form.

Applying the particle-based carrier to the transparent carrier involves providing the undercoat to the transparent carrier and affixing the undercoat to the transparent carrier. "Affixing" the undercoat to the transparent carrier generally includes fusing the undercoat particles to form a matrix. For example, heat may be applied, causing the undercoat particles to melt together or cross-link. Other methods of affixing the undercoat to the transparent carrier may be used, however, depending on the physical or chemical properties of the particle-based undercoat. The particle-based undercoat may be applied to the transparent carrier in a single step, or the undercoat may be first provided to the carrier and then affixed to the carrier. The particle-based undercoat may also be applied to form a layer of uniform or non-uniform thickness across the transparent carrier.

Once provided to the surface of the transparent carrier, the particle-based undercoat is affixed to the transparent carrier surface, usually by fusing. Fusing is the process of inducing the powder to coalesce, flow into a film, and adhere to the substrate. Fusing can be accomplished with non-contact methods such as radiant heat or flash fusing. Contact methods, such as hot rollers or high pressure cold rollers, may also be used. If contact methods are used, the contact surface may be textured in order to impart a texture to the undercoat and, thus, the underside of the print. Lubricants, such as silicone oil, may be applied to the contact surface, or additives, such as waxes or other release agents, may be applied to the powdered substrate to aid in the release of the product from the contact surface.

In some embodiments, the transparent carrier is preheated to facilitate application of the undercoat. Such preheating facilitates the complete flow and adhesion of the undercoat to the transparent media. Pre-heating may be accomplished by a conductive heater under the carrier, a hot roll fuser, or a radiant heater over the carrier surface.

Application of a particle-based undercoat, rather than a solid laminate layer, provides distinct advantages over the known prior art. The known prior art discloses methods of producing photographic-quality prints by laminating images between laminate members. Aligning the different laminate members is an important step in practicing such methods; if laminate members are not aligned, post-application trimming of excess laminate is required. The particle-based undercoat applied in the present invention does not require such alignment. The present invention also provides an additional advantage over known prior art laminate methods because the particle-based undercoat can be applied during an in-line process, rather than a separate off-line step typical of most lamination processes. Lamination methods can also trap pockets of air between the laminate and media thus degrading the final product. The particles of the undercoat can fill in any surface defects (such as crevices or pits) in the transparent carrier or printed image thereby eliminating any air pockets or bubbles.

Most previously known laminate methods are small volume laminating processes requiring manual loading of a print into a laminator. The print, comprising a sandwich of laminate members, is first aligned to the laminate web on two edges, then loaded into a laminator. After processing, the print must be separated from the laminate web by cutting the laminate. Alternatively, a precut sheet can be aligned to the print on all four edges, and the pair can be sent through laminator rollers. The method of present invention can be practiced without such an intermediate lamination step—the entire print can be produced using one continuous in-line process.

Covering the image with a particle-based undercoat also offers the advantage of providing an intimate, gap-free bond with the transparent carrier, thus protecting the image from the environment. Particle-based undercoats suitable for use with the present invention include undercoats such as opaque powdercoats, toners, pigments, or powdered plastics. White opaque undercoats may be used to simulate a matte around the edge of a photo (i.e., when seen through the transparent carrier, the white opaque undercoat provides a border around the image similar to some photographs), though undercoats of any color may be used. Additionally, transparent or translucent particle-based undercoats may be used, if such a unique effect is desired.

A print of the present invention is illustrated by FIG. 1. The print comprises a transparent carrier (2) having first and second surfaces. In FIG. 1, the first surface is the top of the transparent carrier, while the second surface—to which an image is applied—is the bottom. An image (4) is applied to the second surface of the transparent carrier (2). A particle-based undercoat (6), as disclosed herein, is also applied to the second surface of the transparent carrier and at least partly, but preferably completely, covers the image. The image can be viewed through the first surface of the transparent carrier (or, if a transparent or translucent undercoat is used, the image can also be viewed through the undercoat). As such, the carrier and particle-based undercoat house and protect the image.

Prints embodied in the present invention can be produced by a variety of apparatuses. Such apparatuses typically comprise the elements illustrated in FIG. 2, though it will be appreciated that other apparatuses may be employed without departing from the scope and true spirit of the present invention.

Figure 2:
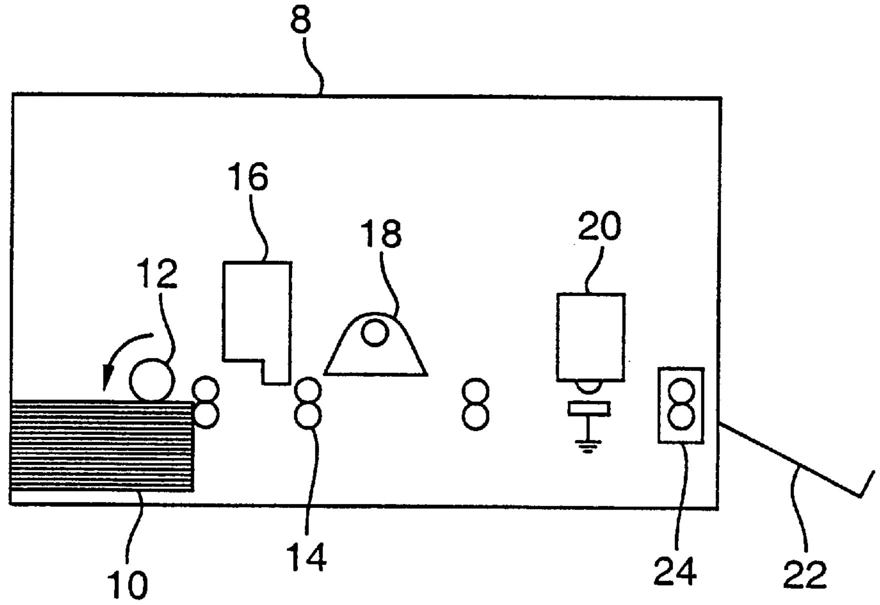
FIG. 2 is a schematic layout of an apparatus for producing photographic-quality prints of the present invention.

The apparatus of FIG. 2 generally comprises a frame (8) housing a loader (10), an imager (16), and an undercoat module (20). The loader (10) comprises a mechanism similar to known mechanisms for loading paper in printers or photocopiers including, but not limited to, openings for hand-feeding individual sheets of the transparent carrier, loading bins capable of holding several sheets of the transparent carrier, or combinations thereof. If a loading bin is used, a pick roller (12) may be used to load sheets of the transparent carrier into the system.

Once a sheet of the transparent carrier is loaded into the system, transport rollers (14), or other similar means, are used to move the transparent carrier through the system. These transport rollers (14) may further comprise heating elements for heating the transparent carrier and/or melting the particle-based undercoat.

The imager (16) comprises an inkjet print engine, electrostatic toner engine, or other mechanism capable of providing an image to the transparent carrier. If an inkjet print engine is used, such as the one employed in the Hewlett-Packard Model 970 Inkjet printer, a dryer (18) may be included in the apparatus for drying the image before the particle-based undercoat is applied.

The particle-based undercoat is applied by the undercoat module (20). The undercoat module comprises a mechanism capable of applying the particle-based undercoat to the transparent carrier. Such mechanisms operate by spraying, sifting, rolling, brushing, or electrostatically transferring the particle-based undercoat onto the carrier, or by applying the undercoat using other similar means such as disclosed herein. Suitable undercoat modules include those based on the non-contact jump gap developer modules from HP Color Laserjet 4500 printers.

Depending on the type and form of particle-based undercoat used, a fuser module (24) may be included for melting the particle-based undercoat to facilitate formation of the undercoat film and its adhesion to the transparent carrier. The fuser module could comprise a set of heated rollers capable of melting and flowing the plastic particles. The fuser module can also be configured to impart a texture to the undercoat.

The completed photographic-quality print can be removed from the apparatus or ejected from the apparatus into an output tray (22).

While the present invention is described above in connection with at least one preferred embodiment, it will be readily understood that the scope of the present invention is not intended to be limited to any particular preferred embodiment or embodiments. Instead, this description is intended to cover all alternatives, modifications, and equivalents that may be included within the spirit and scope of the invention as defined by the claims.

We claim:

1. A photographic-quality print, comprising:

a transparent carrier having first and second surfaces;

an image on the second surface of the transparent carrier; and a particle-based undercoat, the particles being fused together to form the undercoat and the undercoat being fused to the second surface of the carrier, such that at least a portion of the image is between the transparent carrier and the particle-based undercoat.

2. The photographic-quality print according to claim 1 wherein the fused particles of the particle-based undercoat comprise an opaque powdercoat, toner, pigment, or powdered plastic.

3. The photographic-quality print according to claim 1 wherein the fused particles of the particle-based undercoat comprise one or more of the following: poly(vinyl chloride), poly(vinylidene chloride), poly(vinyl chloride-co-vinylidene chloride), chlorinated polypropylene, poly(vinyl chloride-co-vinyl acetate), poly(vinyl chloride-co-vinyl acetate-co-maleic anhydride), ethyl cellulose, nitrocellulose, poly(acrylic acid) esters, linseed oil-modified alkyd resins, rosin-modified alkyd resins, phenol-modified alkyd resins, phenolic resins, polyesters, poly(vinyl butyral), polyisocyanate resins, polyurethanes, poly(vinyl acetate), polyamides, chroman resins, gum damar, ketone resins, maleic acid resins, vinyl polymers, polystyrene, polyvinyltoluene, copolymers of vinyl polymers with methacrylates or acrylates, low-molecular weight polyethylene, phenol-modified pentaerythitol esters, poly(styrene-co-indene-co-acrylonitrile), poly(styrene-co-indene), poly(styrene-co-acrylonitrile), copolymers with siloxanes, polyalkenes, and poly(styrene-co-butadiene).

4. The photographic-quality print according to claim 1 wherein the image is provided to the transparent carrier using inkjet printing methods.

5. The photographic-quality print according to claim 1 wherein the image is provided to the transparent carrier by reverse printing methods.

* * * * *